United States Patent Office 2,917,541
Patented Dec. 15, 1959

2,917,541

NEW N,N-DIBENZYL AMINO ACID COMPOUNDS AND PROCESS OF MAKING SAME

Jesus Anatol, Neuilly-sur-Seine, and Vesperto Torelli, Maisons-Alfort, France, assignors to UCLAF, Paris, France, a corporation of France No Drawing. Application June 27, 1955
Serial No. 518,337

Claims priority, application France August 3, 1954

2 Claims. (Cl. 260—518)

The present invention relates to new amino acid derivatives and more particularly to new N,N-dibenzyl amino acids, their nitriles, and amides, and to a process of making same.

While N-monobenzyl derivatives of amino acids can be prepared by a number of processes, the production of N,N-dibenzyl derivatives of such amino acids is rather difficult. Reacting benzyl chloride upon an amino acid or its esters yields mixtures of mono- and dibenzyl derivatives with the starting material. Separation of said mixtures is quite cumbersome and costly.

It is one object of the present invention to provide an improved process of preparing N,N-dibenzyl amino acids of the following Formula I:

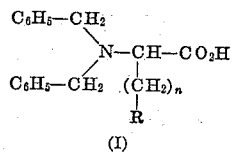

(I)

In said formula R indicates hydrogen, an alkyl radical which may be substituted by a hydroxyl group or by a sulfur containing group, an aryl radical or a heterocyclic radical, while $n$ is 0 or an integer between 1 and 8.

Another object of the present invention consists in providing new N,N-dibenzyl amino acids, their acid addition salts, their nitriles, and their amides.

Other objects of the present invention and advantageous features thereof will become apparent as the description proceeds.

The new compounds according to the above given Formula I differ advantageously from most of the known N-derivatives of amino acids by their ability to readily crystallize and to be soluble in neutral, water-immiscible, organic solvents such as chloroform, benzene, diethyl ether, and di-isopropyl ether. Said new compounds also permit formation of hydrochlorides which are likewise readily soluble in organic solvents and which are stable in acid and alkaline medium. Said properties of the hydrochlorides facilitate their purification.

The amino group of said N,N-dibenzyl amino acids is readily set free by hydrogenolysis. The dibenzyl compounds corresponding to Formula I can be employed not only for preparing N,N-dibenzyl peptides after their conversion into acid halogenides or mixed anhydrides, but also for the synthetic preparation of the corresponding non-substituted very pure amino acids.

N,N-dibenzyl amino acids according to the present invention can also advantageously be employed as starting materials in the process of resolving racemic amino acids into their optically active components by converting them into salts with optically active bases. The presence of the N,N-dibenzyl group in such compounds increases the molecular size and, therefore, tends to facilitate crystallization of the optically active salts. Regeneration of the free amino acid by hydrogenolysis is effected without racemization.

Moreover, said new derivatives readily permit formation of O-peptides by using as an intermediate starting material for peptide formation hydroxy amino acids which are dibenzylated at their nitrogen atom. For this purpose it is sufficient to esterify the free hydroxyl group of such N,N-dibenzyl substituted hydroxy amino acids by reaction with the hydrochloride of an amino acid chloride or with any other suitable esterifying derivative of an amino acid. By setting free, by hydrogenolysis, the amino group in the resulting condensation product, the corresponding O-peptide is obtained. The starting material used in this reaction, the N,N-hydroxy amino acid, corresponds to the following Formula II:

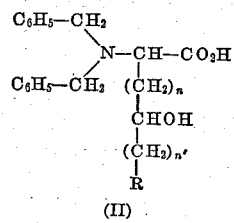

(II)

In said formula R indicates hydrogen or an alkyl radical while $n$ is 0 or an integer from 1 to 8, and $n'$ also indicates 0 or an integer from 1 to 8, and may be different or like $n$.

The process according to the present invention is carried out by reacting dibenzylamine with the cyanohydrin of an aldehyde of Formula III. Thereby, the nitrile of an N,N-dibenzyl amino acid of Formula IV is obtained which is either directly hydrolyzed to the corresponding N,N-dibenzyl amino acid of Formula I or is first converted into the corresponding N,N-dibenzyl amino acid amide of Formula V. The following equations illustrate this reaction:

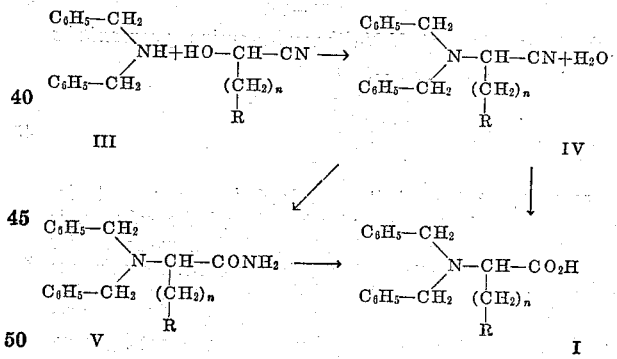

In order to prepare an N,N-dibenzyl hydroxy amino acid according to Formula II, the cyanohydrin of a hydroxy aldehyde of Formula VI is employed as starting material. Such a cyanohydrin corresponds to the following formula

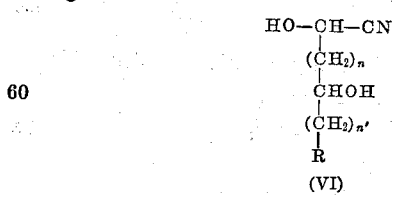

(VI)

In the above given formulas R indicates hydrogen or an alkyl radical while $n$ and $n'$ represent 0 or the same or different integer from 1 to 8.

The hydroxyl group of said cyanohydrin is preferably protected during condensation and is set free only when hydrolyzing the nitrile to the carboxylic acid by means of acids. It is also possible to effect such hydrolysis by alkaline saponification since the N,N-dibenzyl group is stable in alkaline medium and is not affected by alkaline hydrolyzing agents.

In order to carry out the first phase of the process according to the present invention, dibenzylamine is allowed to react with an aldehyde cyanohydrin of Formula III at elevated temperature and preferably while boiling under reflux in a suitable solvent. The reaction is generally completed within a few hours. When working in the absence of a solvent, it is advisable to take care that the reaction temperature does not exceed about 80° C. during condensation. The resulting nitrile of Formula IV is allowed to crystallize. It is filtered off and, if necessary, recrystallized.

In the second phase of the process according to the present invention said nitrile is converted into the amide of Formula V by the action of a strong acid, preferably of sulfuric acid. The resulting amide is then hydrolyzed to the corresponding N,N-dibenzyl amino acid of Formula I which can be extracted with ether or other solvents.

It is, of course, also possible to directly saponify the nitrile of Formula IV to the corresponding N,N-dibenzyl amino acid of Formula I. By subjecting said nitrile of Formula IV to alcoholysis, the corresponding ester of said N,N-dibenzyl amino acid is obtained which subsequently is saponified. In agreement with statements made in the literature, direct saponification or alcoholysis can only be carried out with difficulty with nitriles of amino acids. Thereby, lower yields are obtained than by subjecting the nitriles to acid hydrolysis according to the present invention.

The following examples serve to illustrate the present invention without, however, limiting the same thereto.

EXAMPLE 1

*Preparation of N,N-dibenzyl-DL-α-alanine*

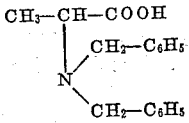

(a) *Preparation of N,N-dibenzyl-α-amino propionitrile*

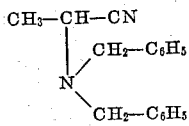

53.25 g. of lactonitrile, obtained from acetaldehyde, are dissolved in 100 cc. of ethanol and the solution is boiled under reflux with 147.75 g. of dibenzyl-amine for 4 hours. The reaction mixture is cooled, the precipitate is filtered off, washed with ethanol, and dried. 184.5 g. of N,N-dibenzyl-α-amino propionitrile are obtained. The compound is of sufficient purity for subsequent hydrolysis. The yield amounts to 98.4%.

One part of said compound is recrystallized, for analytical purposes, from one part by volume of ethanol. It forms prismatic crystals of the melting point: 87° C.

*Analysis.*—$C_{17}H_{18}N_2 = 250.33$. Calculated: 81.56% C; 7.25% H; 11.19% N. Found: 81.7% C; 7.5% H; 11.1% N.

(b) *Preparation of N,N-dibenzyl-α-amino propionamide*

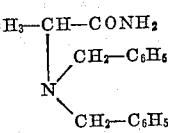

184.5 g. of the nitrile prepared as described above under (a) are added in small portions to 720 cc. of concentrated sulfuric acid (66° Baumé) at 0° C. Thereby the temperature increases to 20–25° C. The mixture is heated on the boiling water bath for one hour, cooled, and poured into a mixture of 8 kg. of ice and 4 l. of water. About 2,600 cc. of 10 N sodium hydroxide solution are added to render the mixture alkaline. The alkaline mixture is allowed to stand for one night. The precipitated crystals of N,N-dibenzyl-α-propionamide are filtered and washed with water until free of sulfate ions. On drying, 187.5 g. of N,N-dibenzyl-α-propionamide, having a melting point of 141–142° C., are obtained. Said compound is sufficiently pure for further working up. By recrystallization from aqueous ethanol (1:1), the compound is obtained in needles of the same melting point as given above.

*Analysis.*—$C_{17}H_{20}ON_2 = 268.35$. Calculated: 76.08% C; 7.56% H; 5.96% O; 10.44% N. Found: 76.0% C; 7.6% H; 6.2% O; 10.4% N.

(c) *Saponification of N,N-dibenzyl-α-amino propionamide*

187.5 g. of the amide prepared as described hereinabove under (b) are dissolved in 1000 cc. of concentrated hydrochloric acid (density=1.19) and 1000 cc. of water. The solution is heated under reflux for 72 hours. The mixture is then concentrated by evaporation in a vacuum until crystallization sets in. On cooling, the residue solidifies. On filtration, washing with water, and drying, 214 g. of the hydrochloride of the salt of N,N-dibenzyl-DL-α-alanine with N,N-dibenzyl-DL-α-alanine are obtained. Said compound has a melting point of 110–115° C. which is increased to 115–120° C. on recrystallization of one part of said salt in 2 parts by volume of warm water. Said compound crystallizes with 2.5 mols of water and corresponds to the following formula

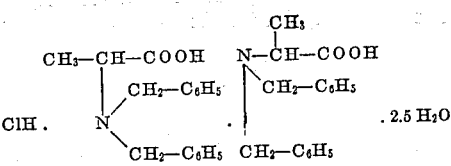

Said salt loses its water of crystallization on drying at 80° C. It is soluble in the cold in ethanol and concentrated hydrochloric acid; it is only slightly soluble in the cold but readily soluble, on heating, in water, dilute hydrochloric acid, and chloroform. The anhydrous salt obtained by drying at 80° C. is used for analytical purposes.

*Analysis.*—$C_{34}H_{39}O_4N_2Cl = 575.13$. Calculated: 71.0% C; 6.84% H; 11.13% O; 4.87% N; 6.16% Cl. Found: 71.1% C; 7.0% H; 11.4% O; 4.7% N; 5.7% Cl.

N,N-dibenzyl-DL-α-alanine are obtained from said complex salt by dissolving 50 g. thereof, while heating, in a mixture of 25 cc. of water and 50 cc. of 5 N sodium hydroxide solution. The warm solution is acidified with 15 cc. of acetic acid. The acidified mixture is allowed to stand overnight. The precipitated crystals are filtered, washed with water, and dried. The crystals contain considerable amounts of water of crystallization and are dehydrated by dissolving the compound in a suitable solvent such as benzene or cyclohexane which, on distillation, forms an azeotropic mixture with water and, thereby, carries off the water of crystallization. After dehydration and elimination of the solvent, 1 part of the N,N-dibenzyl-DL-α-alanine is recrystallized in 2 parts by volume of cyclohexane. Melting point: 97–98° C.

*Analysis.*—$C_{17}H_{19}O_2N = 269.33$. Calculated: 75.81% C; 7.11% H; 11.88% O; 5.20% N. Found: 75.8% C; 7.2% H; 12.2% O; 5.0% N.

N,N-dibenzyl-DL-α-alanine is also obtained in a polymorphous form of a different melting point which is formed on recrystallization from petroleum ether. Said new crystalline form melts at 80° C.

N,N-dibenzyl-DL-α-alanine is soluble, in the cold, in ethanol, ethyl acetate, benzene, chloroform; it is insoluble in water and slightly soluble in the cold in cyclohexane and petroleum ether.

*Analysis.*—$C_{17}H_{19}O_2N = 269.33$. Calculated: 75.81%

C; 7.11% H; 5.2% N. Found: 75.8% C; 7.3% H; 5.1% N.

It is readily possible to convert one of the polymorphous forms into the other by dissolving the compound in cyclohexane and seeding the solution with a crystal of the polymorphous form desired.

EXAMPLE 2

*Preparation of N,N-dibenzyl-DL-α-amino butyric acid*

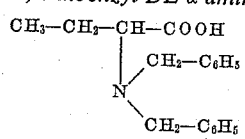

(a) *Preparation of N,N-dibenzyl-α-amino butyronitrile*

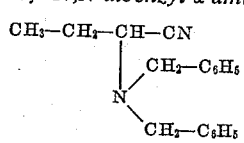

65 g. of α-hydroxy butyronitrile prepared from propionic aldehyde, are boiled under reflux by following the procedure described in Example 1, with 150 g. of dibenzylamine in the presence of 200 cc. of ethanol for 3 hours. The ethanol is then removed by distillation and 202 g. of N,N-dibenzyl-α-amino butyronitrile are obtained in the form of an oil. The yield is quantitative. The compound is sufficiently pure for further working up.

(b) *Preparation of N,N-dibenzyl-α-amino butyramide*

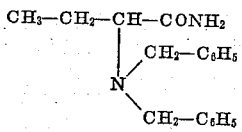

202 g. of the nitrile obtained as described above under (a), are added to 800 cc. of concentrated sulfuric acid (66° Baumé) which had been cooled by means of an ice and salt cooling mixture, in such a manner that the temperature does not exceed +5° C. Thereafter the reaction mixture is allowed to attain room temperature and is then heated on the boiling water bath for one hour. The mixture is cooled and poured into a mixture of 9 kg. of ice and 4,500 cc. of water and is neutralized by the addition of 2,950 cc. of 10 N sodium hydroxide solution. After allowing the mixture to stand overnight, the precipitated amide is filtered and thoroughly washed with water until free of sulfate ions. After draining and drying, 201 g. of N,N-dibenzyl-α-amino butyramide of the melting point 116° C. are obtained. The yield amounts to 93%. On recrystallization from 70% ethanol, the amide is obtained in large needles melting at 123° C.

*Analysis.*—$C_{18}H_{22}ON_2 = 282.38$. Calculated: 76.56% C; 7.85% H; 9.92% N. Found: 76.7% C; 8.1% H; 9.7% N.

(c) *Saponification of N,N-dibenzyl-α-amino butyramide*

110 g. of the amide are boiled under reflux with 1,100 cc. of 5 N hydrochloric acid for 72 hours. Thereafter, the acid is completely removed by evaporation and the residue is dissolved in 300 cc. of 50% ethanol. The solution is again evaporated to dryness in order to drive off most of the hydrochloric acid retained by the reaction product. The residue is dissolved in 300 cc. of 50% methanol and the hydrochloric acid contained therein is neutralized by the addition of pyridine in an amount sufficient to turn the blue color of Congo red paper. The calculated amount of pyridine (32 cc.) is then added in order to set free the dibenzyl amino acid from its hydrochloride. First an oil is formed which soon crystallizes in the form of needles. The crystals are filtered, washed with water, and dried. 81.0 g. of N,N-dibenzyl-DL-α-amino butyric acid melting at 120–125° C. are obtained thereby. The product contains water of crystallization. It is freed from said water of crystallization by dissolving it in benzene and distilling the solution to dryness as described hereinabove in Example 1 with respect to the preparation of N,N-dibenzyl-DL-α-alanine. The resulting residue is dissolved in di-isopropyl ether and the solution is filtered while warm. The filtrate is cooled and yields N,N-dibenzyl-DL-α-amino butyric acid free of water of crystallization and having a melting point of 90–92° C. After recrystallization from di-isopropyl ether, the melting point is raised to 98° C. The acid is soluble, in the cold, in most organic solvents and, on heating, in di-isopropyl ether, petroleum ether, and cyclohexane. It is insoluble in water.

*Analysis.*—$C_{18}H_{21}O_2N = 283.36$. Calculated: 76.29% C; 7.47% H; 4.94% N. Found: 76.1% C; 7.6% H; 4.7% N.

EXAMPLE 3

*Preparation of N,N-dibenzyl-DL-norvaline*

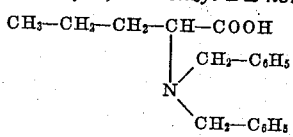

(a) *Preparation of N,N-dibenzyl-α-amino valeronitrile*

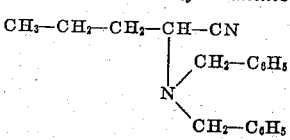

76 g. of α-hydroxy valeronitrile prepared from butyraldehyde are heated under reflux with 150 g. of dibenzylamine and 300 cc. of 95% ethanol for 3 hours. The ethanol is then removed by distillation and the resulting N,N-dibenzyl-α-amino valeronitrile is obtained in the form of an oil. 213 g. corresponding to a quantitative yield are obtained. The compound decomposes on distillation. It is sufficiently pure for further reactions.

(b) *Preparation of N,N-dibenzyl-α-amino valeramide*

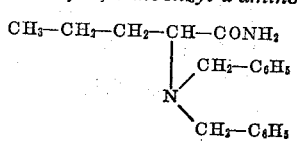

213 g. of N,N-dibenzyl-α-amino valeronitrile obtained as described hereinabove under (a) are added to 850 cc. of concentrated sulfuric acid (66° Baumé) which had been cooled to −8° C., in such a manner that the temperature does not exceed 0° C. The mixture is agitated until the solution becomes homogeneous and is then heated on a boiling water bath for one hour. After cooling, the mixture is poured into a mixture of 9,200 g. of ice and 4,600 cc. of water. The resulting mixture is neutralized by the addition of 3,100 cc. of 10 N sodium hydroxide solution. The neutralized mixture is allowed to stand overnight. The precipitated amide is filtered off and thoroughly washed with water. After drying, 205 g. of N,N-dibenzyl-α-amino valeramide are obtained. Its melting point is 80° C. The compound is sufficiently pure for further reactions. The yield amounts to 90%.

On recrystallization from petroleum ether the compound is obtained in the form of prisms and the melting point is raised to 89° C.

*Analysis.*—$C_{19}H_{24}ON_2 = 296.4$. Calculated: 76.99% C; 8.16% H; 9.45% N. Found: 77.2% C; 8.4% H; 9.3% N.

(c) *Saponification of N,N-dibenzyl-α-amino valeramide*

145 g. of the N,N-dibenzyl-α-amino valeramide, obtained as described above under (b), are heated under reflux with 1,450 cc. of 5 N hydrochloric acid and 200 cc. of acetic acid for 72 hours. The mixture is evaporated to dryness in a vacuum and the residue is dissolved in 375 cc. of 50% ethanol. The solvent is driven off in such a manner that most of the hydrochloric acid retained by the residue is driven off. The residue is then dissolved in 600 cc. of aqueous 50% methanol. The solution is decolorized by heating with vegetable charcoal, filtered, and neutralized by means of pyridine until Congo red paper does no more turn blue. Thereafter, 40 cc. of pyridine are added in order to set free the N,N-dibenzyl amino acid from its hydrochloride. A viscous oil separates and soon crystallizes in the form of needles. The crystals are filtered, washed with water, and dried. 116 g. of N,N-dibenzyl-DL-norvaline containing considerable amounts of water of crystallization and melting at 125° C. are obtained. Water of crystallization is removed in the same manner as described in the preceding examples by dissolving the compound in 150 cc. of warm benzene which is subsequently evaporated. Said treatment is repeated until the distilled benzene remains clear. The oily residue is dissolved in 400 cc. of boiling petroleum ether. On cooling, anhydrous N,N-dibenzyl-DL-norvaline of the melting point 83–85° C. crystallizes. The compound is soluble, in the cold, in most organic solvents and, on heating, in di-isopropyl ether and petroleum ether. It is insoluble in water.

The compound has a strong tendency to add water of crystallization. When dissolving it in a warm solution of sodium carbonate and reprecipitating it from said solution by means of acetic acid, it crystallizes with water of crystallization and melts at 115–120° C. On keeping it in a closed flask, it becomes insoluble in organic solvents. When again treated with benzene, it is converted into the anhydrous form which is useful in peptide synthesis.

Analysis.—$C_{19}H_{23}O_2N$=297.38  Calculated: 76.73% C; 7.80% H; 10.76% O; 4.71% N. Found: 76.9% C; 8.0% H; 10.8% O; 4.7% N.

EXAMPLE 4

Preparation of N,N-dibenzyl-DL-valine

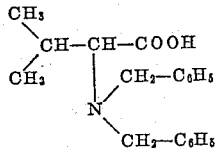

(a) Preparation of N,N-dibenzyl-α-amino-isovalonitrile

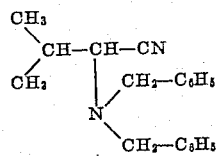

25 g. of α-hydroxy isovaleronitrile obtained from isobutyric aldehyde, and 50 g. of dibenzylamine are placed into a flask cooled in a cooling bath. 100 cc. of ethanol are added thereto and the mixture is heated under reflux for 4 hours. After filtration, the reaction mixture is cooled and the precipitated compound is filtered off. On recrystallization from 1½ parts of ethanol, N,N-dibenzyl-α-amino isovaleronitrile is obtained in the form of colorless tablets melting at 113° C. The yield is about 90%. The compound is insoluble in water, aqueous acids and alkalies, and soluble in ethanol, ether, acetone, benzene, and chloroform. It does not form a hydrochloride.

Analysis.—$C_{19}H_{22}N_2$=278.4.  Calculated: 82.0% C; 8.0% H; 10.1% N. Found: 82.3% C; 7.7% H; 10.2% N.

(b) Preparation of N,N-dibenzyl-α-amino isovaleramide

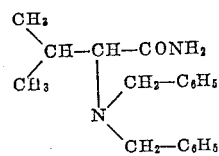

35 g. of N,N-dibenzyl-α-amino isovaleronitrile are added rapidly and without agitation to 140 cc. of concentrated sulfuric acid (66° Baumé) whereby the temperature of the mixture is kept below +10° C. Thereafter, the cooling bath is removed to cause dissolution of the nitrile. The mixture is then heated on a boiling water bath for one hour. After cooling, the mixture is poured into a mixture of ice and water and a 10 N sodium hydroxide solution is added while stirring until the reaction mixture is rendered alkaline to phenolphthalein. The precipitated amide is washed, dried, and recrystallized from boiling ethanol. In this manner N,N-dibenzyl-α-amino isovaleramide is obtained in the form of white prisms melting at 144° C. The yield is 81%. Said compound is insoluble in water, aqueous acids and alkalies, fairly soluble in ethanol, and soluble in ether, acetone, benzene, and chloroform. On heating with hydrochloric acid, it forms a colorless hydrochloride melting at 185–190° C.

Analysis.—$C_{19}H_{24}ON_2$=296.4.  Calculated: 77.0% C; 8.2% H; 9.45% N; 5.4% O. Found: 77.0% C; 8.3% H; 9.5% N; 5.7% O.

(c) Saponification of N,N-dibenzyl-α-amino isovaleramide 161 g. of N,N-dibenzyl-α-amino isovaleramide and 550 cc. of glacial acetic acid are placed into a flask placed in a cooling bath. 275 cc. of water and thereafter 550 cc. of 5 N hydrochloric acid are added thereto and the mixture is boiled under reflux for 70 hours. The residue obtained on evaporation in a vacuum is dissolved in 300 cc. of 50% ethanol and the solution is distilled in a vacuum to completely remove hydrochloric acid present therein. The residue is then dissolved in 800 cc. of 2 N sodium hydroxide solution. Acetic acid is added to said solution until its pH-value is 4.0. The resulting mixture is extracted three times with, all in all, 800 cc. of ether. The extract is filtered, the filter residue is washed with ether, and the ethereal solution is dried over anhydrous sodium sulfate. The ether is evaporated and the remaining residue crystallizes. The crystals are purified by recrystallization from petroleum ether. In this manner, N,N-dibenzyl-DL-valine is obtained in white tablets of the melting point 114–115° C. The yield is 70%. The compound is insoluble in water and dilute aqueous acids, soluble in warm dilute alkalies, and in ethanol, ether, acetone, benzene, chloroform, petroleum ether, and cyclohexane.

Analysis.—$C_{19}H_{23}O_2N$=297.4.  Calculated: 76.7% C; 7.8% H; 4.7% N. Found: 76.9% C; 7.7% H; 4.8% N.

EXAMPLE 5

Preparation of N,N-dibenzyl-DL-leucine

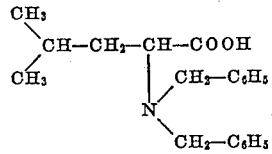

(a) Preparation of N,N-dibenzyl-α-amino-isocapronitrile

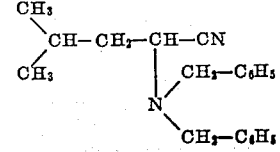

92 g. of α-hydroxy isocapronitrile obtained from isovaleraldehyde, are dissolved in 250 cc. of 95% ethanol. The solution is heated under reflux with 160 g. of dibenzylamine for 3 hours. On cooling, the N,N-dibenzyl-α-amino isocapronitrile crystallizes. It is filtered, washed with 95% ethanol, drained, and dried. 199.5 g. of said crude nitrile are obtained. The yield amounts to 84.1%. The melting point of the crude compound is 56° C. It is sufficiently pure for further working up. On recrystallization from 95% ethanol, large prisms melting at 60° C. are obtained.

Analysis. — $C_{20}H_{24}N_2=292.41$. Calculated: 82.14% C; 8.27% H; 9.58% N. Found: 82.4% C; 8.2% H; 9.7% N.

(b) *Preparation of N,N-dibenzyl-α-amino isocaproylamide*

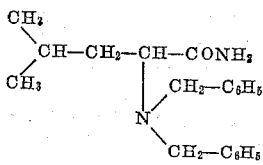

189.5 g. of N,N-dibenzyl-α-amino isocapronitrile prepared as described hereinabove under (a) are added, while stirring mechanically, to 760 cc. of concentrated sulfuric acid (66° Baumé) which had been cooled to 0° C. The mixture is stirred for one hour in order to obtain a homogeneous solution and is then heated on the boiling water bath for one hour. After cooling, it is poured into a mixture of 9 kg. of ice and 4 l. of water. The resulting mixture is then neutralized by the addition of 2,750 cc. of a 10 N sodium hydroxide solution.

A paste is formed which is filtered and thoroughly washed with water in order to remove the greater part of sodium sulfate retained therein. The washed paste is dissolved in 1,500 cc. of boiling methanol and is filtered while still farm. The filtered solution is rendered neutral to phenolphthalein by the addition of sodium hydroxide solution. 700 cc. of water are added to said neutralized solution and the oil which separates is allowed to crystallize. The crystals are filtered, after standing overnight, and are washed with water until they are free of sulfate ions. After drying, the crystals are recrystallized from petroleum ether. In this manner, 131.5 g. of N,N-dibenzyl-α-amino isocaproyl amide of the melting point 102–103° C. are obtained. The yield is 65%. The compound is sufficiently pure for conversion into N,N-dibenzyl leucine.

For analytical purposes, the compound is recrystallized from cyclohexane. The melting point of said recrystallized amide is 119–120° C.

Analysis.—$C_{20}H_{26}ON_2=310.43$. Calculated: 77.37% C; 8.45% H; 9.0% N. Found: 77.6% C; 8.4% H; 9.0% N.

(c) *Saponification of N,N-dibenzyl-α-amino isocaproyl amide*

77 g. of the amide of the melting point 102–103° C. obtained as described hereinabove under (b) are heated under reflux with 385 cc. of concentrated hydrochloric acid (density=1.19), 385 cc. of water, and 200 cc. of acetic acid for 72 hours. The mixture is evaporated to dryness in a vacuum and the residue is dissolved in 200 cc. of 50% ethanol. The ethanol is distilled off in order to remove as much as possible of the hydrochloric acid retained by said residue. The resulting residue is then dissolved in 250 cc. of warm 50% methanol, and is decolorized by means of decolorizing carbon. The cooled solution is neutralized by the addition of pyridine until Congo red paper does no more turn blue. Thereafter, 20 cc. of pyridine are added in order to set free the N,N-dibenzyl-DL-leucine from its hydrochloride. The acid separates in the form of an oil and is extracted by means of ethyl acetate. The extract is washed with water, dried over magnesium sulfate, and the solvent is evaporated. The resulting N,N-dibenzyl-DL-leucine contains considerable amounts of water of crystallization and is freed thereof by azeotropic distillation with benzene as described in the preceding examples. The residue remaining after evaporation of the benzene is recrystallized from petroleum ether. 25.5 g. of the acid melting at 97° C. are obtained. The yield amounts to 33% of the theoretical yield.

A second portion of said acid is recovered from the mother liquors, thus increasing the overall yield to 50%.

Recrystallization from petroleum ether raises the melting point of the acid to 99° C.

N,N-dibenzyl leucine is soluble in most of the organic solvents, fairly soluble in cyclohexane, and soluble, on heating, in petroleum ether.

Analysis.— $C_{20}H_{25}O_2N=311.4$. Calculated: 77.13% C; 8.09% H; 4.5% N. Found: 76.9% C; 8.1% H; 4.6% N.

The resulting N,N-dibenzyl amino acids according to the present invention can readily be converted into peptides, for instance, according to the process of co-pending application Serial No. 488,702 of Gaston Amiard and Leon Velluz entitled, New N-Benzyl Peptides and a Process of Making Same, which application was filed on February 16, 1955.

According to the process of said co-pending application, the N,N-dibenzyl amino acid is first converted into the hydrochloride of its acid chloride by reacting the hydrochloride of the N,N-dibenzyl amino acid with phosphorus pentachloride in benzene solution and condensing said acid chloride with the hydrochloride of the desired amino acid ester, saponifying the resulting dibenzyl dipeptide ester, and subjecting the dibenzyl dipeptide obtained thereby to hydrogenolysis to split off the benzyl groups.

In a similar manner tri- and polypeptides can be obtained by using dibenzyl di- or polypeptides as starting materials and reacting said peptides with amino acid esters. Such procedures are also described in detail in the above mentioned co-pending application Serial No. 488,702.

The N,N-dibenzyl amino acids according to the present invention and the di- and polypeptides obtained by means of said N,N-dibenzyl amino acids are of great value in the ultimate synthesis of protein-like compounds. They may also be used, after splitting off the benzyl groups, for nutritional purposes, for instance, in place of protein hydrolysates. They permit the administration of very definite and specific amino acids and peptides to overcome certain amino acid deficiencies. They are of considerable advantage over known protein hydrolysates because they allow proper, precise, and controlled dosage. The amino acids and peptides can also be used for technical purposes in place of protein hydrolysates and the like.

We claim:

1. In a process of producing N,N-dibenzyl-α-amino acids of the formula

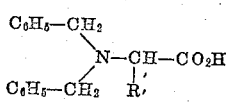

wherein R indicates a member selected from the group consisting of hydrogen, a lower alkyl radical, and a lower alkyl radical substituted by a hydroxyl group, the steps which consist in condensing the cyanohydrin of an aliphatic aldehyde of the formula

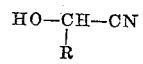

wherein R represents the same substituent as indicated above, in alcoholic solution with dibenzylamine at an elevated temperature, hydrolyzing the resulting N,N-dibenzyl-α-amino acid nitrile by means of concentrated sulfuric acid to form the corresponding N,N-dibenzyl-α- amino acid amide, isolating said amino acid amide in crystalline form from the hydrolysis mixture, and saponifying said crystalline amino acid amide by means of aqueous hydrochloric acid to form the corresponding N,N-dibenzyl-α-amino acid of the above given formula.

2. In a process of producing N,N-dibenzyl-α-amino acids of the formula

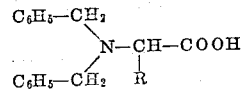

wherein R indicates a member selected from the group consisting of hydrogen, a lower alkyl radical, and a lower alkyl radical substituted by a hydroxyl group, the steps which consist in condensing the cyanohydrin of an aliphatic aldehyde of the formula

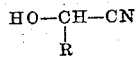

wherein R represents the same substituent as indicated above, in alcoholic solution with dibenzylamine at an elevated temperature, hydrolyzing the resulting N,N-dibenzyl-α-amino acid nitrile by means of concentrated sulfuric acid to form the corresponding N,N-dibenzyl-α-amino acid amide, isolating said amino acid amide in crystalline form from the hydrolysis mixture, and saponifying said crystalline amino acid amide by means of aqueous hydrochloric acid with the addition of acetic acid to form the corresponding N,N-dibenzyl-α-amino acid of the above given formula.

References Cited in the file of this patent

UNITED STATES PATENTS

| | | |
|---|---|---|
| 2,268,108 | Collie et al. | Dec. 30, 1941 |
| 2,314,440 | Bock et al. | Mar. 30, 1943 |
| 2,328,940 | Alderson, Jr. et al. | Sept. 7, 1943 |
| 2,466,177 | Long | Apr. 5, 1949 |

FOREIGN PATENTS

| | | |
|---|---|---|
| 634,073 | Great Britain | Mar. 15, 1950 |
| 1,100,016 | France | Mar. 30, 1955 |

OTHER REFERENCES

Chem. Abstracts, vol. 44 (1950), pgs. 12338 and 12813 (Index).

Karrer: Organic Chemistry (4th English Edit.), 950, pg. 285.